Figure 1:
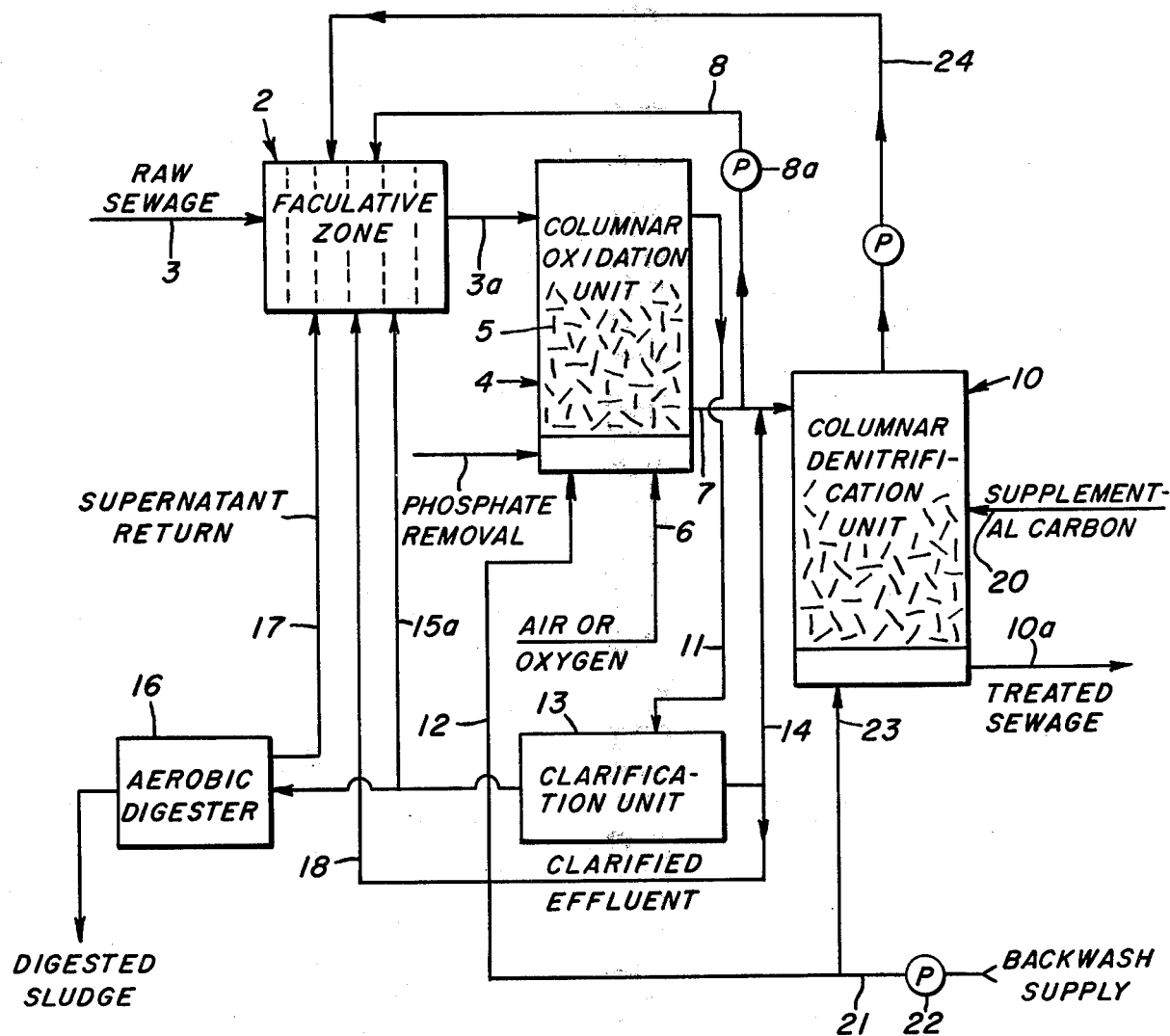

United States Patent [19]

Savage et al.

[11] 4,179,374
[45] Dec. 18, 1979

[54] APPARATUS FOR THE TREATMENT OF WASTEWATER

[75] Inventors: Elton S. Savage, Wexford; Jeffrey J. Chen, Pittsburgh, both of Pa.

[73] Assignee: Dravo Corporation, Pittsburgh, Pa.

[21] Appl. No.: 843,203

[22] Filed: Oct. 18, 1977

Related U.S. Application Data

[60] Continuation of Ser. No. 685,770, May 12, 1976, abandoned, which is a division of Ser. No. 483,231, Jun. 26, 1974, abandoned.

[51] Int. Cl.² ............................................. C02C 1/06
[52] U.S. Cl. .................................... 210/151; 210/202; 210/DIG. 28; 210/196; 210/275
[58] Field of Search ..................... 210/DIG. 28, 2–8, 210/11, 14, 15–18, 150, 151, 63, 195, 196–198, 200–202, 275

[56] References Cited

U.S. PATENT DOCUMENTS

| | | | |
|---|---|---|---|
| 2,562,510 | 7/1951 | Schlenz | 210/5 |
| 3,579,439 | 5/1971 | Meiring et al. | 210/5 |
| 3,709,364 | 1/1973 | Savage | 210/DIG. 28 |
| 3,713,543 | 1/1973 | Heaney | 210/8 |
| 3,846,289 | 11/1974 | Jeris et al. | 210/8 |
| 3,964,998 | 6/1976 | Barnard | 210/DIG. 28 |
| 3,994,803 | 11/1976 | Neff et al. | 210/DIG. 28 |

FOREIGN PATENT DOCUMENTS 2338853  2/1974  Fed. Rep. of Germany ... 210/DIG. 28

Primary Examiner—Benoit Castel
Attorney, Agent, or Firm—Parmelee, Miller, Welsh & Kratz

[57] ABSTRACT

Apparatus for the treatment of wastewater has an enclosed unit providing a facultative zone wherein a mixture low in dissolved carbon comprising raw sewage and partially processed sewage undergoes denitrification brought about by faculative organisms contained in the prevailing low oxygen environment. Effluent from the facultative zone is charged into an enclosed columnar oxidation unit where a controlled flow of air or oxygen oxidizes nitrogen compounds present in raw sewage into nitrates. Part of the effluent from this columnar oxidation unit wherein the limited flow of oxygen has been mostly consumed in oxidizing the nitrogen compounds and is low in dissolved oxygen is recycled to the facultative zone and part flows into a columnar denitrification zone wherein anaerobic microorganisms substantially completely remove nitrogen as gas from the nitrates producing an effluent with a low nitrate content. Columnar oxidation units and denitrification units are in essentially deep-bed filters. Desirably also the facultative zone is provided in a columnar unit.

7 Claims, 2 Drawing Figures

APPARATUS FOR THE TREATMENT OF WASTEWATER

This application is a continuation of our application Ser. No. 685,770 filed May 12, 1976 as a division of parent application Ser. No. 483,231 for "Wastewater Treatment Process and Apparatus," filed June 26, 1974, and both now abandoned.

BACKGROUND OF THE INVENTION

Prior Art

It is common practice in sewage treatment to aerate the raw or partially treated sewage or industrial effluent in an aeration tank to promote reduction of the organic matter by aerobic microorganisms present in the sewage. The mixed liquor from the aeration zone is then transferred to a clarifier where the particulate matter, carrying with it the microorganisms, settles to the bottom as sludge. In the activated sludge process, a portion of the sludge from the clarifier containing the microorganisms is reintroduced into the aerator along with the raw sewage to intensify the biological activity.

During aeration, a portion of the carbonaceous waste is oxidized to carbon dioxide which escapes into the atmosphere. The remaining portion is converted to biomass which remains as particulate matter in the mixed liquor that is discharged from the aeration zone. Nitrogen containing compounds, such as ammonia, are converted to nitrates by the biological activity induced by aeration. These nitrates are also discharged from the aeration zone in the mixed liquor. Until recently, the nitrates, along with the phosphates that are present in the waste, were merely discharged in the effluent from the clarifier. However, it has now been recognized that these nitrates and phosphates produce overfertilization in natural water resources, such as lakes and streams, into which the effluent containing these nutrients is discharged. Such overgrowth cannot only be unsightly but can be harmful to the ecological balance of the water and can be especially harmful to the fish population.

Present technology for removing nitrogen from sewage or other liquid streams includes oxidizing the nitrogen present in the waste to its most highly oxidized state, namely nitrate, and then reducing the nitrate to nitrogen gas. When biological oxidation and reduction is used it is referred to as the biological nitrification-denitrification process. Other potential processes are air stripping of ammonia gas and removal of ammonia or nitrate ions by ion exchange.

However, it is generally agreed that the biological nitrification-denitrification process is the most practical and economical. The usual approach is to oxidize the ammonia, nitrogen and organic nitrogen to nitrates in either a single stage or two stage system utilizing air or oxygen as the oxygen source. During the oxidization, carbon is removed by oxidation to carbon dioxide or conversion to carbonaceous solids prior to or in conjunction with the nitrogen oxidation. Following nitrification, it is then necessary to denitrify by removing the oxygen source in the presence of anaerobic bacteria. Since carbon is removed in the nitrification stage, it may be necessary to add supplemental carbon during the denitrification. Usually, methanol or a similar product is added to the denitrification stage as a supplemental carbon feed.

Much of the apparatus presently available for the biological denitrification of sewage requires large or extensive power-driven mechanisms of various kinds. According to the present invention, apparatus is provided which is more compact and wherein the extensive mechanism heretofore required can be dispensed with, and the need to add carbon by the introduction of a carbon compound, usually methanol, is eliminated or substantially reduced, particularly after the apparatus has been operated for a period of time.

SUMMARY OF THE PRESENT INVENTION

According to the present invention, raw sewage is combined with partially treated sewage from selected portions of the apparatus in an enclosure providing a facultative zone. A facultative zone is produced where the mixture of raw sewage and partially treated sewage lacks sufficient oxygen to sustain effective growth of aerobic microorganisms, thereby inducing denitrification by the action of facultative organisms that are both present in the mixture and are supplied to the mixture from the recycling of some of the partially treated sewage. Facultative microorganisms are defined as anaerobic bacteria capable of saprophytic existence, as well as in the absence of air or oxygen, and the facultative zone, being enclosed, provides an environment low in oxygen to enhance and optimize the growth of facultative microorganisms, the function of which is to denitrify nitrates in the mixture in the facultative zone.

Preferably the facultative zone is most effectively provided in an enclosed columnar reactor, and as hereinafter explained, there is a filter-like media on which anaerobic organisms may develop and resist excessive removal thereof with the effluent from the facultative zone.

The effluent from the facultative zone enters the top of a columnar aerator, flowing downwardly through the filter-like bed against a controlled flow of air or oxygen. Oxygen and liquid are thus brought into intimate contact in the presence of aerobic organisms, oxidizing some of the carbon contained in the liquid and satisfying the biochemical oxygen demand (BOD) for the mixture entering the reactor. Some of the oxidizable content is also oxidized to solids which are separately disposed of.

The effluent liquid from the columnar oxidation unit, which now contains little air or oxygen, is recycled to the facultative zone to mix with the incoming raw sewage to lower the oxygen content of the mixture and assure that a favorable facultative environment is maintained.

There is a third reactor, also an enclosed columnar reactor, into the upper part of which that part of the effluent from the aeration reactor not recycled to the facultative zone is discharged. It is a denitrification reactor where nitrogen gas is liberated to break down the nitrates. The effluent liquid from this denitrification reactor is discharged to combined with natural water sources, such as streams, rivers, ponds or lakes. Anaerobic bacteria develop in the filter of the columnar denitrification reactor, and as in the facultative zone, they are effective for releasing nitrogen as gas from nitrate-bearing liquid.

Columnar reactors in the nature of deep bed filters require more or less frequent backwashing, that is, flowing clear water in a reverse direction through the filter bed. According to this invention, the backwash water after passing through the filter bed is discharged through a closed conduit into the facultative zone along with the raw sewage and recycled effluent from the oxidation reactor. In this way, anaerobic microorganisms which develop in columnar denitrification filter beds are supplied to the facultative zone to maintain its effectiveness.

The accompanying drawings show two preferred embodiments of the apparatus.

Figure 2:
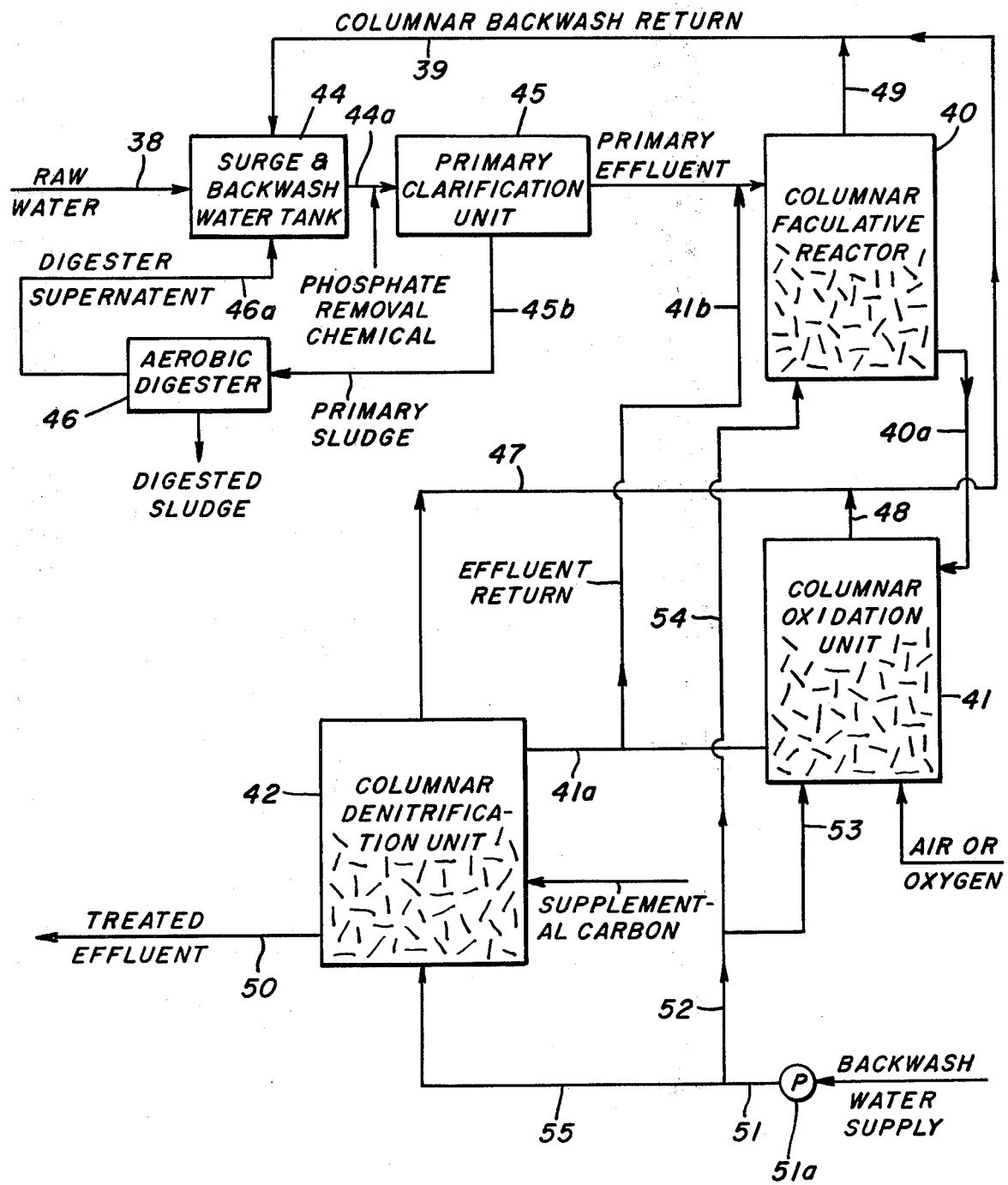

FIG. 1 discloses schematically a system in which the facultative zone may or may not be a columnar reactor; and FIG. 2 is another schematic diagram in which a preferable arrangement having three columnar reactors is provided.

Looking first at FIG. 1, it essentially is the same as FIG. 3 of application Ser. No. 685,770, except that the elements labeled columnar oxidation and denitrification units have been schematically illustrated to more clearly indicate conventional deep bed filters with provision for introducing backwash water in the usual way, and circulation pumps have been indicated. It may be pointed out that the specification of Ser. No. 685,770 at page 13 refers to U.S. Pat. No. 3,709,364 granted on Jan. 9, 1973 on an application filed Sept. 2, 1970, as showing such a columnar unit.

In FIG. 1, there is disclosed an enclosed reactor 2 providing within it a facultative zone, and which could be and desirably is a columnar unit, but can be an enclosure of some other nature to which free access of atmospheric air is excluded. There is a pipe 3 through which raw incoming sewage enters the facultative zone and there is a discharge conduit 3a through which effluent liquid from the facultative zone is transferred into the enclosed upper portion of a columnar reactor 4 of the type above referred to.

The liquid entering the upper portion of the columnar reactor flows down through coarse deep bed filtering media 5 while a controlled flow of oxygen, preferably as air is introduced at 6 into the lower portion of the reactor 4 to flow counter to the downcoming liquid, bringing about an intimate contact between the liquid and the oxygen. In this columnar oxidation, BOD reduction is completed along with the nitrification of oxidizable nitrogen compounds. Also, in passing down the columnar oxidation unit, a substantial portion of suspended solids present in the mixture is removed in the filter bed.

The effluent from the columnar oxidation unit is removed at 7 and a portion thereof, rich in nitrates, is returned through closed duct 8 to the facultative zone to agitate and mix with the incoming raw sewage. A pump is indicated at 8a.

Oxygen admitted to the enclosed columnar oxidation unit is controlled to a point where it is largely consumed and the carry-over of oxygen to the facultative zone is such that the level of dissolved oxygen in the mixture does not exceed, and preferably is below, 4 milligrams per liter of the mixture. It is desirable, however, to maintain at least trace levels of dissolved oxygen in the mixture in the facultative zone in order to prevent the formation of odorous gases, such as hydrogen sulfide, but as previously explained, oxygen should not be present to a sufficient extent to prevent the effective concentration of anaerobic microorganisms. A dissolved oxygen level between 0.10 and 2.0 milligrams per liter in the mixture has been found to provide best results.

The partial reduction of the BOD which occurs in the facultative zone along with the intimate contact between the controlled inlet of air into the columnar aeration unit substantially reduces the volume and hence the cost of compressing air for use in the apparatus. With an enclosed facultative zone and an enclosed columnar reactor and closed ducts and the controlled inlet of oxygen through pipe 6 in any of several different ways apparent to those skilled in the art to the columnar reactor, the amount of dissolved oxygen can be closely regulated.

During aeration, some of the remaining carbon is oxidized to carbon dioxide, and a larger portion is converted to biomass suspended in the liquid. During aeration, ammonia, nitrogen and organic nitrogen compounds are oxidized to nitrites and then to nitrates which are then dissolved in the mixed liquor effluent from the aeration unit.

The portion of the effluent from the aeration unit which is not returned to the facultative zone continues through pipe 7 into the upper portion of a second enclosed columnar reactor 10, which is a denitrification unit. In this unit, the liquid from pipe 7, high in nitrates but low in dissolved oxygen, filters in devious courses through the filter bed in which there are retained anaerobic organisms that denitrify the nitrates in the liquid, releasing the nitrogen as gas and leaving only innocuous residue to be carried out through pipe 10a at the bottom.

At intervals, depending upon the entrapment of solids in the bed, the bed is cleaned by backwashing. The backwash water is introduced at the bottom of the columnar unit through pipe 12 connected to supply pipe 21 which includes pump 22. The spent backwash water is withdrawn through pipe 11 terminating in a clarification unit 13. Some of the backwash may flow from the clarification unit, which is an enclosed vessel, through pipe 14 into pipe 7 to be discharged into the columnar denitrification unit. Other liquid with solids is conducted from the clarification unit 13 through pipe 15 to an aerobic digester 16. Digested sludge is discharged from this digester. The supernatant liquid in the digester is conducted through pipe 17 to the facultative zone 2. Other liquid with solids may enter the facultative zone 2 through branch pipe 15a to return to the facultative zone some partially treated solids and liquid without entering the digester.

Clarified effluent may alternatively or in addition circulate backwash from the clarification unit to the facultative zone 2 through pipe 18.

The columnar denitrification unit 10 is enclosed and contains a fast-flow filter bed through which liquid entering the unit flows and is filtered on any solids contained in it. In the filter bed to which ambient air has no access, anaerobic bacteria develop, and if necessary, supplemental carbon may be introduced into the filter bed to accelerate the development of these bacteria, methanol being a carbon compound generally used to develop the growth of such bacteria. An inlet for the introduction of supplemental carbon into the filter bed is indicated at 20.

The effluent from the columnar denitrification unit 10 is discharged at 10a as treated sewage ready to be returned to natural water supplies, often however after final chlorination, as disclosed in U.S. Pat. No. 3,709,364.

It is necessary to backwash the filter bed in the denitrification unit at intervals, both to remove solids extracted by the filtering media and to remove gaseous nitrogen that is liberated from the nitrates in the denitrogenizing reaction and becomes trapped in the filter media. Pipe 21 with pump 22 supplies backwash water also to pipe 12 and to valved pipe 23 that supplies backwash water to the columnar unit 10.

Backwash water from unit 10, including also backwash entering unit 10 through pipe 14 and pipe 7, is carried through enclosed conduit 24, in which there may be the usual pump as indicated, back to the facultative zone 2. Since the backwash from 10 carries with it anaerobic microorganisms, these enter the facultative zone to replace the facultative bacteria that are carried out of this zone with the effluent through pipe 3a into the columnar oxidation unit.

The recirculation of the backwash from the two columnar units, as well as the recycling of partially treated sewage through pipe 8 to the facultative zone, serves to mix and combine these liquids with the incoming raw sewage in the facultative zone and, because of the low dissolved oxygen content of the mixture as heretofore described, 50%-80% denitrification is effected in the facultative zone and the remaining 50%-20% is substantially removed in the columnar denitrification unit 10.

FIG. 2 corresponds generally to FIG. 4 of our earlier application of which this is a continuation, but more accurately represents the several columnar units. It illustrates an apparatus generally similar to that shown in FIG. 3, but wherein the facultative zone is maintained in a columnar facultative reactor 40. The reactor 40 is a columnar unit which is structurally similar to the columnar oxidation unit 41 and the columnar denitrification unit 42 and their respective counterparts 4 and 10 in FIG. 1. In the apparatus shown in FIG. 2, the raw wastewater at 38 is directed into a surge tank 44 which also serves as a collection tank for the backwash water from the columnar facultative reactor 40, the columnar oxidation unit 41, the columnar denitrification unit 42 and the supernatant liquor from the aerobic digester 46. Backwash water from the columnar facultative reactor 40, the columnar oxidation unit 41 and the columnar denitrification unit 42 is directed respectively via lines 47, 48 and 49 into a common return line 39 which terminates at the surge tank 44. This mixture produced in the surge tank then passes via line 44a to a primary clarification unit 45 where settleable solids are removed, the sludge from the primary clarifier being directed via line 45b to the aerobic digester 46. The digester supernatant liquid is returned through line 46a to the tank 44. The primary effluent 45a from the clarification unit 45 is charged into the upper portion of the columnar facultative reactor 40 and mixed with a portion of the nitrified effluent returned via line 41b from the columnar oxidation unit 41, under conditions which promote denitrification of the nitrates in the effluent return from the columnar oxidation unit 41 and partial reduction of the BOD content of the effluent from the primary clarifier. The mixture then passes via line 40a to the columnar oxidation unit 41 wherein BOD reduction is completed and nitrification of the sewage is effected. The portion of nitrified effluent from the columnar oxidation unit 41 that is not returned to the columnar facultative reactor 40 through line 41b is directed through line 41a to a columnar denitrification unit 42 wherein removal of nitrates is effected, and treated denitrified effluent discharged at 50 from the treatment plant.

A clean backwash water line is indicated at 51 with a pump 51a. Branch 52 has a branch 53 for supplying backwash water to the columnar oxidation unit 41 and a line 54 leads to the bottom of the columnar facultative unit 40. A third branch 55 leads from pipe 51 to the bottom of denitrification unit 42.

It should be clear from the above exemplary processes and the discussions relating thereto that many modifications in the manner of recycling partially treated sewage from one or more stages of a sewage treatment process are possible and fully within the scope of the present invention. It is also clear from the above discussion that mixing recycled, partially treated sewage high in nitrates with a raw sewage influent under facultative conditions promotes the simultaneous denitrification of the recycled sewage and initiates BOD reduction of the raw sewage with the carbon for denitrification being supplied by the raw sewage and the oxygen for the BOD reduction being made available by the denitrification. This simultaneous carrying out of two mutually supportive processes not only reduces the number of steps required and, therefore, the time and the equipment needed to carry out the process, but it also reduces the need for supplemental carbon to carry out denitrification, the reduction in the amount of air needed for aeration and a reduction in the amount of sludge produced which must be disposed of.

The provision of a columnar oxidation unit along with a columnar denitrification unit greatly reduces the size and complexity of the process and eliminates heavy power operated equipment commonly necessary in biological nitrification-denitrification systems, and this is particularly so where, as in FIG. 2, the facultative unit as well as the oxidation and denitrification units are columnar reactors with the backwash from all three recycled to the facultative unit. The blower equipment necessary for supplying air to the oxidizing unit is much less expensive to operate as well as to install, and the return of backwash and the solids and bacteria from the columnar units to the facultative zone helps to maintain that zone functionally operative and by ultimate discharge to the clarifier and sludge digester for removal from the system.

Although the sludge digester is preferably an aerobic type as described, it is to be understood that an anaerobic digester may be used instead.

We claim:
1. A sewage treatment plant comprising:
    (a) an enclosed facultative unit arranged to simultaneously receive and contain a liquid mixture of raw sewage and sewage that is recycled after partial processing in the plant and having an effluent conduit for the discharge of said mixture therefrom and having inlet means for connection with a source of raw sewage;
    (b) an enclosed columnar oxidizing unit comprising a deep bed filter with a filter bed therein arranged to receive the effluent from the facultative unit at a location where said effluent will percolate downwardly through the filter bed, said oxidizing unit having an inlet below said filter bed arranged for connection with a controlled flow of gas comprising oxygen or air which is discharged into the oxidizing unit to flow countercurrent to the downwardly percolating effluent from the facultative unit, and means arranged to provide an effluent outlet after it has percolated through said filter bed;
    (c) said columnar oxidizing unit being provided with means for backwashing the filter bed with water, and means arranged to digest and remove sludge from the spent backwash water after its passage through the filter bed and recycle at least part of the partially treated sewage after removal of the sludge therefrom to the facultative unit;

(d) conduit means arranged to conduct part of the effluent from said effluent outlet of the oxidizing unit into the facultative unit while excluding contact thereof with ambient air whereby the dissolved oxygen carried over from the oxidizing unit in the mixture in the facultative unit may be maintained below a preselected level;

(e) a columnar denitrification unit in the nature of a deep bed filter;

(f) conduit means for discharging that portion of the effluent from the oxidizing unit which is not returned to the facultative unit into the upper end of the denitrification unit to percolate down through the filter bed of said unit for effecting denitrification of dissolved nitrates in the downflowing liquid by establishment and growth of facultative microorganisms in the filter bed of the said denitrification unit, said columnar denitrification unit having an outlet below the filter bed for the discharge of the filtered effluent; and (g) backwashing means to effect the reverse flow of wash water through the filter bed of the denitrification unit and outlet means above the filter bed for removing the spent backwash water from the filter bed and conducting at least a portion of the backwash water along with facultative bacteria removed by such backwashing into the facultative zone to replenish facultative bacteria in the facultative zone that are removed with the effluent liquid mixture from the facultative zone or otherwise destroyed; and (h) conduit means leading from above the filter bed of the columnar oxidation unit for the removal of spent backwash water therefrom and comprising means to digest and remove entrained sludge therefrom and recycle the water to the facultative zone.

2. Apparatus as defined in claim 1 in which the facultative unit is comprised also of an enclosed columnar unit in the nature of a deep bed filter with backwashing means, and means are provided for circulating the incoming raw sewage, the recycled partially treated sewage and the backwash generated from all three columnar units into the filter bed of the columnar facultative unit to intimately contact facultative organisms contained in said bed, said columnar facultative unit having an effluent conduit through which the mixture, after passing through the bed, is transferred to the columnar oxidizing unit.

3. Apparatus as defined in claim 2 in which there is an enclosed surge tank in which the incoming raw sewage and the backwash from all three columnar units is discharged and mixed, said surge tank having an enclosed outlet system through which the mixture is transferred to the columnar facultative unit, and a conduit through which some of the effluent from the oxidation unit is combined with the mixture from the surge tank to enter the facultative unit.

4. Apparatus as defined in claim 3 in which the enclosed system for transferring the mixture from the surge tank to the columnar facultative unit comprises an enclosed clarifier into which some solids collect, and a digester unit including means arranged to receive solids with liquid from the clarifier and means to separate solids for removal from the apparatus and means to recycle the supernatant liquid to the surge tank to ultimately flow into the facultative zone.

5. A sewage processing plant for use in the biological denitrification of sewage wastewater, comprising:

(a) an enclosed columnar facultative reactor with an inlet and an effluent outlet;

(b) an enclosed columnar oxidation reactor having an inlet means for the controlled introduction of oxygen thereto, a backwash inlet and outlet and an effluent outlet;

(c) an enclosed columnar denitrification reactor with an inlet, a backwash inlet and outlet and a treated liquid discharge means, all three of said reactors comprising deep bed filters with the inlets at the top and the effluent outlets at the bottom and the backwash inlets at the bottom and the backwash outlets at the top;

(d) means for introducing wastewater to be processed into said columnar facultative reactor;

(e) means for transferring water from the outlet of the columnar facultative reactor to the inlet of the oxidation reactor;

(f) means for simultaneously transferring a portion only of the effluent from the effluent outlet of the oxidizing reactor to the inlet of the columnar denitrification reactor and the remaining portion to the facultative reactor;

(g) means arranged to transfer backwash from the oxidation reactor to the facultative reactor, including a clarifier and sludge digester and digested sludge disposal means effectively interposed between said two reactors;

(h) means arranged to transfer backwash from the denitrification reactor to the facultative reactor; and (i) said arrangement thereby providing a flow of the wastewater through the three reactors in the order named before its final discharge with an effective concentration of anaerobic organisms in the facultative reactor and a controlled regulation of aerobic organisms therein.

6. The apparatus defined in claim 5 in which there is a surge tank into which effluent backwash liquids along with the incoming raw sewage are first mixed out of contact with ambient air and there is a conduit from which the mixture is transferred from the surge tank to the facultative columnar reactor.

7. The apparatus defined in claim 6 in which conduit means is provided for conducting part of the effluent from the lower portion of the columnar oxidizing reactor directly into the upper portion of the columnar facultative reactor.

* * * * *